Dec. 3, 1957   P. ASPERGER   2,815,245
DUMPING TRAILER
Filed Feb. 9, 1954   3 Sheets-Sheet 1
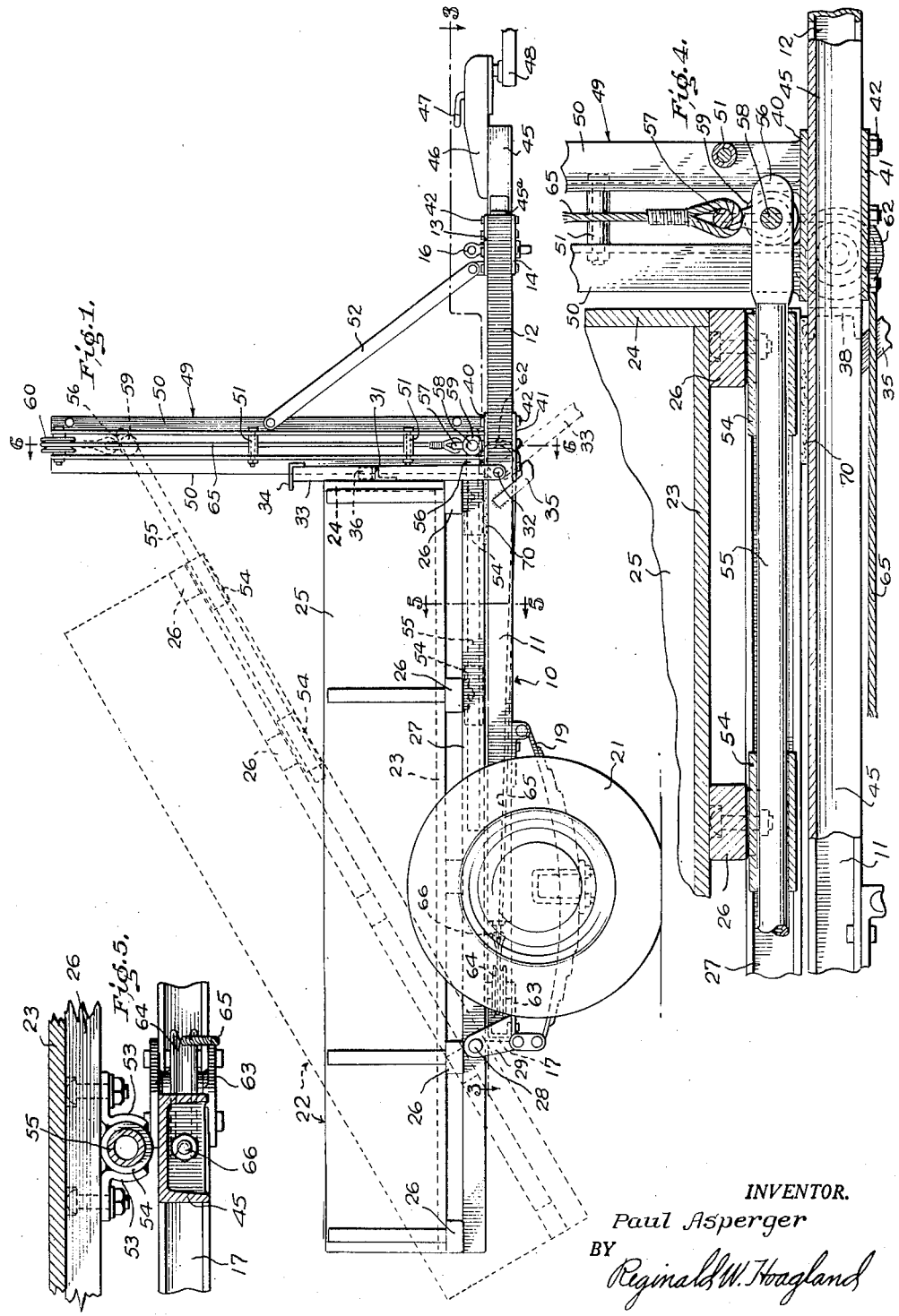
INVENTOR.
Paul Asperger
BY Reginald W. Hoagland
ATTORNEY

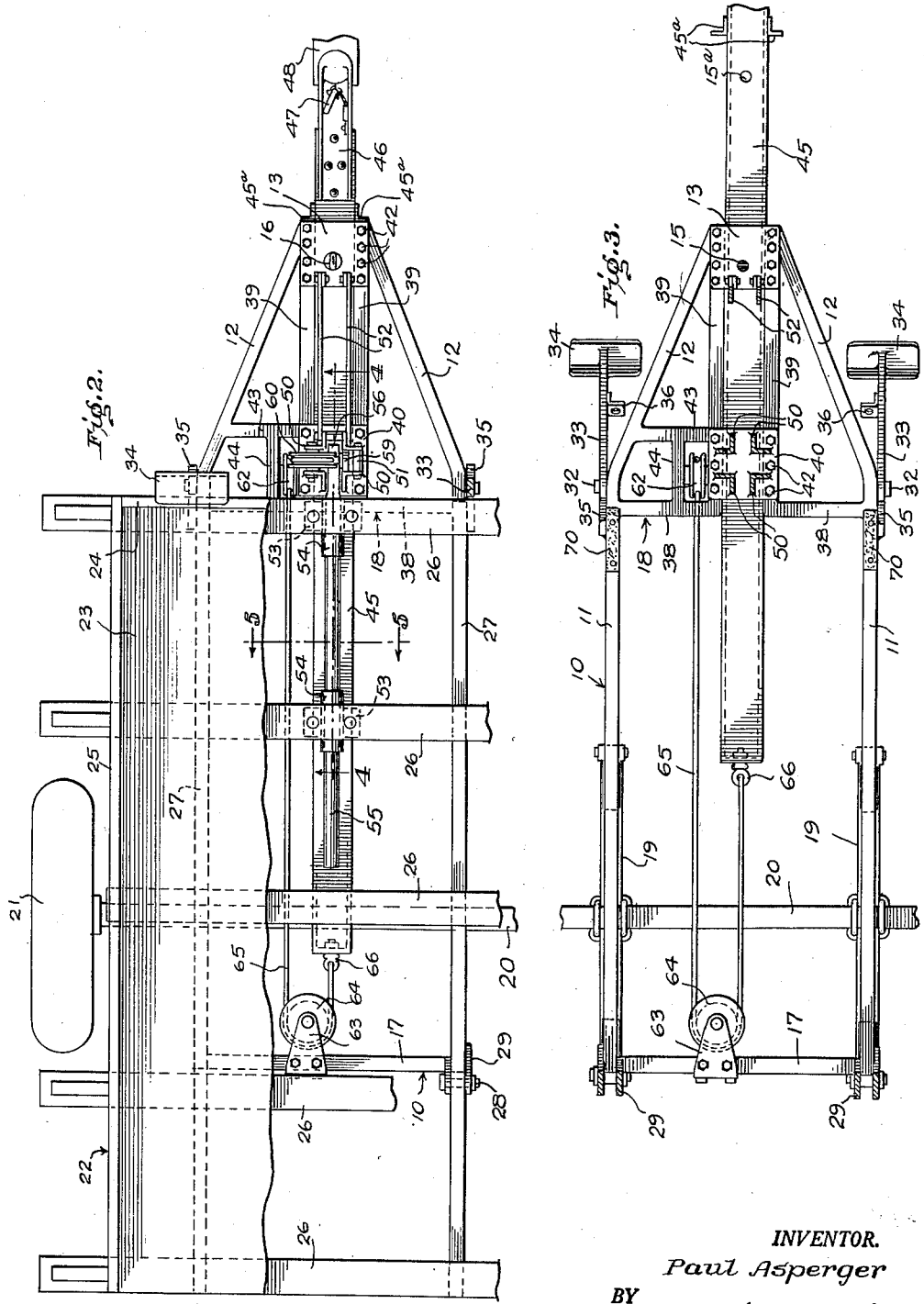

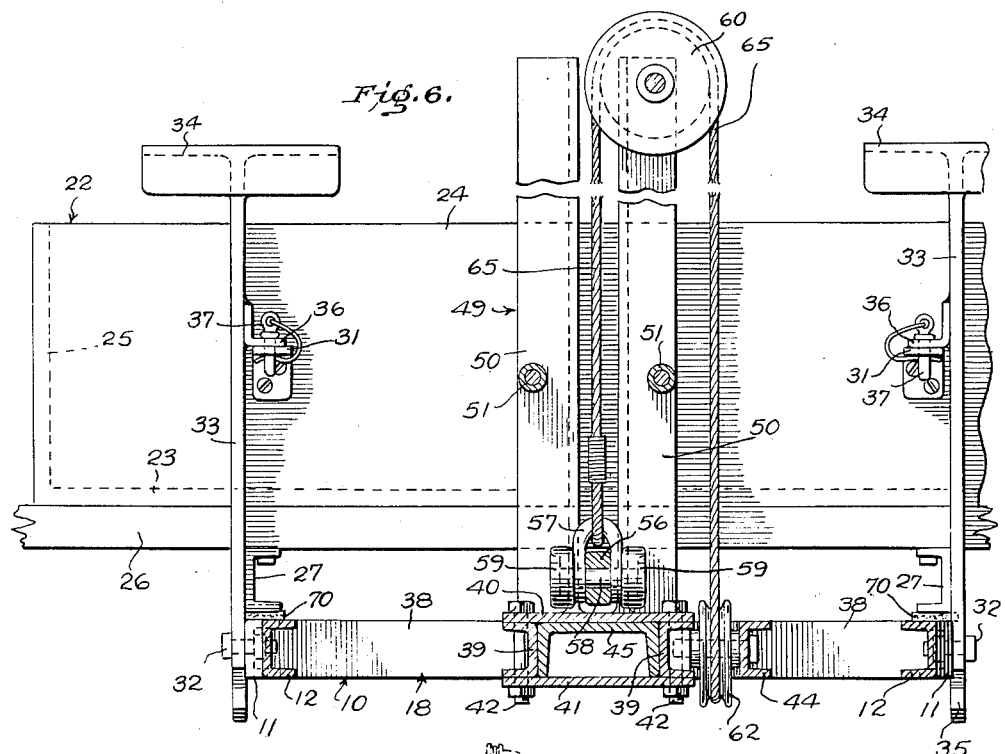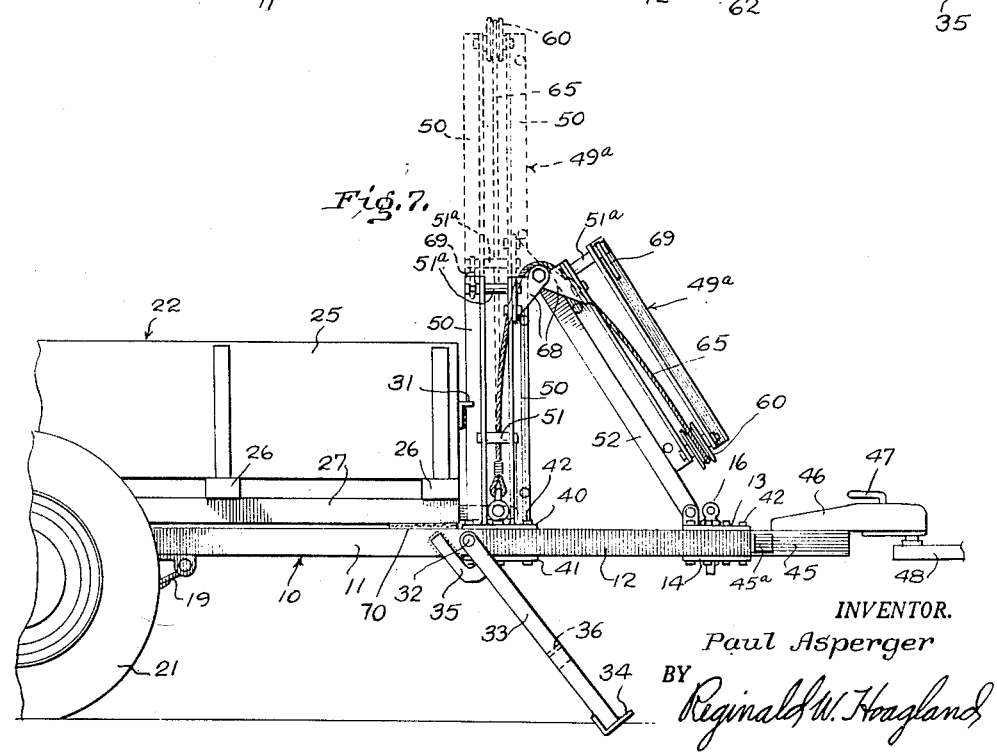

2,815,245
DUMPING TRAILER
Paul Asperger, Flint, Mich.

Application February 9, 1954, Serial No. 409,228

4 Claims. (Cl. 298—20)

The present invention relates to a dumping trailer, and it consists in the combinations, constructions, and arrangements of parts herein described and claimed.

Generally, the present invention comprises an improved device which embodies some of the features in my co-pending application, Serial No. 346,769, filed April 3, 1953, now Patent No. 2,800,362, issued July 23, 1957, for a Dumping Trailer. The present device comprises a trailer having a frame provided with a pair of supporting wheels and having pivotally mounted thereon adjacent the rear end thereof a trailer body. A vertical mast is affixed to the forward end of the trailer frame, and an elongated draw bar is centrally and longitudinally slidable in the frame and is provided at its forward end with a trailer hitch whereby the same may be attached to a tractor vehicle. A supporting bar is longitudinally slidable in the underside of the body and at its forward end is provided with means for vertical movement within the confines of the mast. The forward end of the support bar is attached to a cable which, in turn, passes over a novel arrangement of pulleys and is connected at its other end to the rearward end of the draw bar. As in my former application, a pin is adapted to normally hold the draw bar against movement but, when withdrawn, and the supporting wheels of the trailer are chocked, the tractor vehicle may be utilized to draw the bar outwardly of the trailer frame whereby to lift the forward end of the trailer body and to dump the contents thereof rearwardly of the trailer. If desired, the device may be utilized for spreading the contents of the body over a given area. A novel feature of the present invention is the provision of novel chocks carried by the trailer frame in such manner that, when lowered, they act as conventional chocks but, when raised, act as anchors for the forward end of the body to maintain the latter in a horizontal position. In a modified form of the invention, there is provided novel means for collapsing the mast so that the overall height of the device may be lessened when the same is in transit. The device contains other novel features which will be brought out in the annexed specification.

It is accordingly an object of the invention to provide a trailer having a dumping body thereon and novel means for actuating the same.

Another object of the invention is to provide, in a device of the character set forth, a novel slidable support bar for a dumping trailer body forming a part of the invention.

Still another object of the invention is to provide, in a device of the character set forth, a novel collapsible mast forming a part of the invention.

A further object of the invention is to provide, in a device of the character set forth, novel combined chocks and body anchor members forming parts of the invention.

Still another object of the invention is to provide, in a device of the character set forth, novel guide means for the vertical movement of the forward end portion of a support bar forming a part of the invention.

A still further object of the invention is to provide a device of the character set forth which is simple in construction, inexpensive to manufacture, and yet effective and efficient in use.

Other and further objects of the invention will become apparent from a reading of the following specification taken in conjunction with the drawings, in which:

Figure 1 is a side elevational view of an embodiment of the invention;

Figure 2 is a plan view, partly broken away, of the device illustrated in Figure 1;

Figure 3 is a sectional view taken substantially along line 3—3 of Figure 1;

Figure 4 is an enlarged fragmentary sectional view taken along line 4—4 of Figure 2;

Figure 5 is an enlarged fragmentary sectional view taken along line 5—5 of Figure 2;

Figure 6 is an enlarged fragmentary sectional view taken along line 6—6 of Figure 1; and, Figure 7 is a fragmentary view similar to Figure 1 but illustrating a modification of the invention.

Referring more particularly to the drawings, there is shown therein a trailer frame generally designated at 10 and comprising a pair of longitudinally extending side bars 11 whose forward ends have integrally formed therewith inwardly and forwardly converging arms 12 to the upper side of the forward ends of which is bolted or otherwise affixed a plate 13 and to the lower side of the forward ends of which is affixed a plate 14. The plates 13 and 14 are provided with vertically registering openings 15 for the reception therethrough of a pin 16. The frame 10 is also provided with a rear cross bar 17 and a forward cross construction, generally indicated by the numeral 18.

Conventional leaf springs 19 are mounted upon the underside of the rear portion of each of the side bars 11, and an axle 20 centrally interconnects the springs 19 and has mounted upon opposite ends thereof supporting wheels 21.

A dump body is generally designated at 22 and includes a bottom 23, a forward wall 24, side walls 25, a plurality of longitudinally spaced transversely extending support bars 26 affixed to the underside of the bottom 23, and a pair of spaced, longitudinal channel members 27 affixed to the undersides of the transverse bars 26 which are inwardly spaced from the sides 25 and are directly above the longitudinally extending side bars 11 of the frame 10. The body 22 extends rearwardly of the frame 10, and the channel members 27 are pivotally connected, as indicated at 28, to upstanding brackets 29 mounted upon the rear end corners of the frame.

Mounted upon the forward face of the wall 24 of the body 22 in laterally spaced relation is a pair of forwardly extending apertured latch plates 31, and pivoted to the outer side of each of the side bars 11 adjacent the forward end thereof, as indicated at 32, is a swingable arm 33 provided at its free end with an earth-engaging foot 34. Immediately rearwardly of each of the pivotal points 32, there is affixed, as by welding or the like, a stop member 35 which projects downwardly and forwardly and is designed to limit the rearward movement of its associated arm 33 to a less than vertical position. Each of the arms 33 is provided with an inwardly extending apertured lug 36 which is adapted to immediately overlie and register with one of the members 31 when the arm 33 to which it is attached is in vertical upwardly extending position as shown, for example, in Figure 1 at which time, the members 31 and 36 may be locked together by means of a pin 37 extended through the apertures in said members.

The forward cross construction 18 is composed of a pair of short channel bars 38 laterally extending inwardly toward one another from the forward end portions of the side bars 11 and attached at their inward ends to the rear ends of a pair of separated, longitudinal channel bars 39 secured together and extending rearwardly from the forward ends of the converging arms 12, the forward ends of the spaced bars 39 being secured between the edge portions of the upper and lower plates 13 and 14, while their rear spaced ends are likewise secured between the edge portions of a pair of vertically spaced guide plates 40 and 41. Each of said channel bars 39 presents its bight portion inwardly and has its leg portions connected to the plates 13, 14, 40, and 41 by means of bolts 42 or the like, as clearly shown in Figure 6. Also providing rigidity to the cross construction 18 is a brace 43 extending laterally from one of the converging arms 12 to one of the channel bars 38 and another brace 44 extending longitudinally from the brace 43 to one of the channel bars 38.

An extensible draw bar 45 having inverted U-shaped cross sectional area extends centrally and longitudinally between the upper and lower guide plates 40 and 41, the separated longitudinal channel bars 39, and the upper and lower plates 13 and 14 so as to be slidable therebetween, and a tongue 46 is affixed to the upper face of the forward end portion of the draw bar 45 and is provided with a hitch 47 whereby the same may be connected to the draw bar 48 of a tractor vehicle. An opening 15$^a$ in the draw bar 45 is adapted to be aligned with the openings 15 in the plates 13 and 14 for passage of the pin 16 therethrough to hold the draw bar against longitudinal movement in the frame. The draw bar 45 has secured to opposite sides thereof angles 45$^a$ that abut the forward ends of the separated longitudinal channel bars 39 to limit rearward movement of the draw bar in the frame upon alignment of the opening 15$^a$ with the openings 15.

Mounted atop the upper guide plate 40 and affixed thereto is a mast generally designated at 49 and comprises four squarely spaced vertically extending angle irons 50 provided with suitable spacer members 51. A pair of brace bars 52 interconnect the mast 49 with the plate 13.

Centrally affixed to the underside of the two forwardmost transverse support bars 26 of the body 20 by means of brackets 53 or the like is a pair of longitudinally extending cylindrical guide members 54 in which is slidably mounted a tubular lift arm 55, the forward end of which terminates in a tongue 56 within the confines of the four angle irons 50. A yoke 57 is pivotally connected to the tongue 56 by means of an axle 58 which carries at either end thereof a roller 59, the rollers being adapted to bear against the laterally projecting faces of the angle irons 50.

A pulley 60 is mounted in the upper portion of the mast 49, while a pulley 62 is mounted in the frame 10 between the members 39 and 44. Centrally disposed upon the rear cross bar 17 is a bracket 63 in which is mounted a pulley 64. A cable 65 is affixed, as indicated at 66, to the rearward end of the draw bar 45 and extends rearwardly and is reeved over the pulley 64 from whence it extends forwardly to the pulley 62 under which it is likewise reeved. The cable 65 thence extends upwardly and over the pulley 60 and finally extends in a downward direction and is attached at its other end to the yoke 57.

In the modified form of the invention illustrated in Figure 7, the mast therein shown and indicated generally as 49$^a$ is identical in construction with the mast 49 with the exception that it is severed approximately midway of its length, and each portion thereof is provided with interconnected hinge members 68. In this form, there is a space member 51$^a$ on each portion of the mast adjacent the place where the mast is severed, and links 69 pivoted on extensions of spacer members of one portion of the mast detachably engage other extensions of the spacer member of the other portion to support the mast in erected position.

In the operation of the device in both of its forms, when it is desired to lift the body 22 to its dotted line position shown in Figure 1 so that the contents thereof may be unloaded, it is only necessary to move the arms 33 in a clockwise direction, as viewed, for example, in Figure 7, whereby the ground-engaging feet 34 may be engaged with the ground after which the pin 16 may be removed and the tractor vehicle moved forwardly to thus move the draw bar 45 forwardly of the frame 10. This causes the cable 65 to exert an upward pull upon the tongue 56, thus lifting the body 22. During this lifting operation, it will be apparent that the tubular lift arm 55 will slide forwardly with respect to the body 22 because the forward portion of same is retained within the mast in order that the forward portion of the same may proceed by the rollers 59 in a vertically straight line. The four angle irons 50 constituting the mast will act as guides for the rollers 59 and tongue 56, thus facilitating this upward movement. By moving the tractor vehicle rearwardly, the body 22 will descend by gravity to its original position shown in full lines, for example in Figure 1, and the channel members 27 on said body will rest upon pads 70 provided upon the frame 10. When the vehicle is again in its original position as shown in full lines in Figure 1, the arms 33 may be moved in a counterclockwise direction and then locked in position as shown in Figure 6 by means of the locking pins 37 to hold the body 22 down on the frame 10.

In the form of the invention illustrated in Figure 7, the operation of the device is identical with the exception that when the device is in transit, the upper portion of the mast may be moved forwardly to rest upon the brace bars 52 as shown in full lines in Figure 7 so that the overall height of the mast may be lessened to lower the center of gravity and to so position the mast that it does not form an obstruction to rear view vision.

While I have herein described specific forms the invention may take, it will be understood that changes and modifications may be made by those skilled in the art which still fall within the spirit and scope of the appended claims.

What is claimed is:

1. A dumping trailer comprising a substantially horizontal frame, wheels supporting said frame and mounted adjacent the rear end thereof, a drawbar centrally mounted on said frame for limited reciprocating motion with respect to the frame and extending forwardly therefrom for attachment to a tractor vehicle, a dump body pivotally mounted adjacent its rear end to the rear end portion of said frame, a substantially vertical and upstanding mast centrally and rigidly mounted on the forward end portion of said frame in advance of said dump body, a lift arm longitudinally and slidably mounted on the underside of said dump body and extending forwardly thereof, guide means on the forward end of said lift arm engaging said mast for vertical movement in said mast and thereby imparting sliding movement to said lift arm relative to said body, and elevating means operable by forward movement of the drawbar relative to the frame for lifting the forward end of the lift bar, said elevating means including a mechanism translating forward longitudinal movement of the drawbar to vertical movement of the forward end of said lift bar, said elevating means being operable upon rearward longitudinal movement of said drawbar relative to said frame to lower the forward end of said lift arm.

2. A dumping trailer as defined in claim 1 wherein said mast is composed of four upstanding squared and spaced angle irons and wherein said guide means comprises a pair of rollers that are confined between and bear against adjacent sides of pairs of said angle irons.

3. A dumping trailer comprising a substantially horizontal frame, wheels supporting said frame and mounted adjacent the rear end thereof, a drawbar centrally mounted on said frame for limited reciprocating movement with respect to the frame and extending forwardly therefrom for attachment to a tractor vehicle, a dump body pivotally mounted adjacent its rear end to the rear end portion of said frame, an upwardly extending mast mounted on the forward end portion of said frame and in advance of said dump body, elevating means operable by forward movement of the drawbar relative to said frame for lifting the forward end of the dump body, said elevating means including a mechanism translating forward longitudinal movement of the drawbar to upward movement of the forward end of the dump body, said elevating means being operable upon rearward longitudinal movement of said drawbar relative to said frame to lower the forward end of said dump body, at least one arm pivotally connected at an end thereof to the forward portion of said frame, a ground-engaging foot affixed to the free end of said arm, and a stop member for limiting downward movement of said arm at a position extending forwardly and downwardly from its pivotally connected end.

4. A dumping trailer as defined in claim 3 wherein said arm is manually movable upon its pivotal connection to a position whereby it extends upwardly, and locking means for attaching said arm to said body when said arm is extended upwardly for holding the forward end of said body against upward movement relative to the frame.

References Cited in the file of this patent

UNITED STATES PATENTS

| | | |
|---|---|---|
| 1,256,401 | Ward | Feb. 12, 1918 |
| 1,357,279 | Denny | Nov. 2, 1920 |
| 1,588,396 | Winn | June 8, 1926 |
| 1,607,734 | Fortini | Nov. 23, 1926 |
| 2,444,808 | Coats | July 6, 1948 |
| 2,497,333 | Vermeer | Feb. 14, 1950 |
| 2,686,692 | Hunter et al. | Aug. 17, 1954 |

FOREIGN PATENTS

| | | |
|---|---|---|
| 587,223 | Great Britain | Apr. 17, 1947 |